(12) United States Patent
Ashworth et al.

(10) Patent No.: US 10,389,430 B2
(45) Date of Patent: Aug. 20, 2019

(54) MULTI-AMPLIFIER BOOSTER FOR A WIRELESS COMMUNICATION SYSTEM

(71) Applicant: WILSON ELECTRONICS, LLC, St. George, UT (US)

(72) Inventors: Christopher Ken Ashworth, St. George, UT (US); Glen Stewart Raggio, Mesquite, TX (US); Stephen Todd Fariss, Frisco, TX (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 15/727,365

(22) Filed: Oct. 6, 2017

(65) Prior Publication Data
US 2018/0102828 A1    Apr. 12, 2018

Related U.S. Application Data

(60) Provisional application No. 62/405,605, filed on Oct. 7, 2016.

(51) Int. Cl.
*H04B 7/155* (2006.01)
*H04L 5/00* (2006.01)

(52) U.S. Cl.
CPC ..... *H04B 7/15507* (2013.01); *H04B 7/15535* (2013.01); *H04L 5/0048* (2013.01)

(58) Field of Classification Search
CPC ............ H04B 7/15507; H04B 7/15535; H04L 5/0048
See application file for complete search history.

(56) References Cited

U.S. PATENT DOCUMENTS

| 4,776,032 | A | 10/1988 | Odate et al. |
| 5,303,395 | A | 4/1994 | Dayani |
| 5,737,687 | A | 4/1998 | Martin et al. |
| 5,777,530 | A | 7/1998 | Nakatuka |
| 5,835,848 | A | 11/1998 | Bi et al. |
| 5,995,813 | A | 11/1999 | Ishikura et al. |
| 6,005,884 | A | 12/1999 | Cook et al. |
| 6,377,612 | B1 | 4/2002 | Baker |
| 6,711,388 | B1 | 3/2004 | Neitiniemi |

(Continued)

FOREIGN PATENT DOCUMENTS

| EP | 1525678 B1 | 7/2008 |
| JP | 2010529740 A | 8/2010 |

(Continued)

OTHER PUBLICATIONS

International search report dated Jan. 16, 2018, in International Application No. PCT/US2017/055411, filed Oct. 5, 2017; 3 pages.

(Continued)

*Primary Examiner* — Phuc H Tran
(74) *Attorney, Agent, or Firm* — Thorpe North & Western

(57) ABSTRACT

Technology for multi-amplifier repeaters to offset at least a portion of a determined transmission loss across a RF wired signal path coupled the repeaters, while complying is regulator constraints, is disclosed. A repeater can use an RF reference signal or the RF communication signals to determine the transmission loss across the RF wired signal path, while the repeaters amplify the RF communication signals.

21 Claims, 9 Drawing Sheets

(56) References Cited

U.S. PATENT DOCUMENTS

| | | |
|---|---|---|
| 6,889,033 B2 | 5/2005 | Bongfeldt |
| 6,990,313 B1 | 1/2006 | Yarkosky |
| 7,035,587 B1 | 4/2006 | Yarkosky |
| 7,221,967 B2 | 5/2007 | Van Buren et al. |
| 7,974,573 B2 | 7/2011 | Dean |
| 8,422,540 B1 * | 4/2013 | Negus .................. H04B 1/38 370/210 |
| 9,444,543 B2 * | 9/2016 | Ashworth ............ H03G 3/3042 |
| 2002/0044594 A1 | 4/2002 | Bongfeldt |
| 2002/0045431 A1 | 4/2002 | Bongfeldt |
| 2002/0061763 A1 | 5/2002 | Weissman |
| 2003/0123401 A1 | 7/2003 | Dean |
| 2004/0137854 A1 | 7/2004 | Ge |
| 2004/0146013 A1 | 7/2004 | Song et al. |
| 2004/0166802 A1 | 8/2004 | McKay, Sr. et al. |
| 2004/0219876 A1 | 11/2004 | Baker et al. |
| 2004/0235417 A1 | 11/2004 | Dean |
| 2005/0118949 A1 | 6/2005 | Allen et al. |
| 2005/0130589 A1 | 6/2005 | Weissman |
| 2006/0084379 A1 | 4/2006 | O'Neill |
| 2007/0071128 A1 | 3/2007 | Meir et al. |
| 2007/0188235 A1 | 8/2007 | Dean |
| 2008/0081555 A1 | 4/2008 | Kong et al. |
| 2008/0096483 A1 | 4/2008 | Van Buren et al. |
| 2008/0144543 A1 | 6/2008 | Hunton et al. |
| 2008/0278237 A1 | 11/2008 | Blin |
| 2008/0299896 A1 | 12/2008 | Mohebbi |
| 2009/0093212 A1 | 4/2009 | Shimizu et al. |
| 2011/0151775 A1 | 6/2011 | Kang et al. |
| 2011/0217943 A1 | 9/2011 | Ashworth et al. |
| 2011/0301905 A1 | 12/2011 | Gregg et al. |
| 2013/0082781 A1 | 4/2013 | Van Buren et al. |
| 2013/0142222 A1 | 6/2013 | Wang et al. |
| 2013/0203403 A1 | 8/2013 | Cook et al. |
| 2013/0203404 A1 | 8/2013 | Cook et al. |
| 2014/0194135 A1 | 7/2014 | Terry |
| 2014/0321353 A1 | 10/2014 | Zhan |
| 2015/0011157 A1 * | 1/2015 | Terry .................. H04B 7/15535 455/10 |
| 2016/0028469 A1 | 1/2016 | Ashworth et al. |
| 2017/0041809 A1 * | 2/2017 | Zhan .................. H04W 16/26 |

FOREIGN PATENT DOCUMENTS

| | | |
|---|---|---|
| WO | WO 2008/150534 A2 | 12/2008 |
| WO | WO 2015/116664 A1 | 8/2015 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

ADL5513; "1 MHz to 4 GHz, 80 dB Logarithmic Detector / Controller"; Data Sheet; (2008); 25 pages.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; Data Sheet; (2001); 218 pages.

* cited by examiner

MULTI-AMPLIFIER BOOSTER FOR A WIRELESS COMMUNICATION SYSTEM

FIELD OF THE INVENTION

The present technology relates generally to RF transmission, and in particular control of relay amplifier gain.

BACKGROUND

Wireless communication systems, such as cellular telephone systems, have become common throughout the world. A wireless repeater or booster is a radio frequency (RF) device used to amplify wireless communication signals in both uplink and downlink communication channels, as illustrated in FIG. 1. The uplink channel is generally referred to as the direction from one or more user equipment 110 to a base station 120. The downlink channel is generally referred to as the direction from the base station 120 to the user equipment 110. For a wireless telephone system, the base station 120 may be a cell tower, and the user equipment 110 may be one or more smart phones, tablets, laptops and desktop computers, multimedia devices such as a television or gaming systems, cellular internet of things (CIoT) devices, or other types of computing devices. The repeater 130 typically includes a signal amplifier 140 coupled between two antennas, a donor antenna 150 and a server antenna 160. The donor antenna 150 can be configured to transmit and receive uplink and downlink signal between the repeater 130 and one or more base stations 120. The server antenna 160 can be configured to transmit and receive uplink and downlink signals between the repeater 130 and one or more user equipment 110. Constraints imposed by government agencies, industry standards, or similar regulatory entities may limit the amount of amplification (gain), the maximum output power, the output noise, and other parameters associated with the operation of the repeater 130. Therefore, there is a continuing need for improved wireless repeaters.

DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
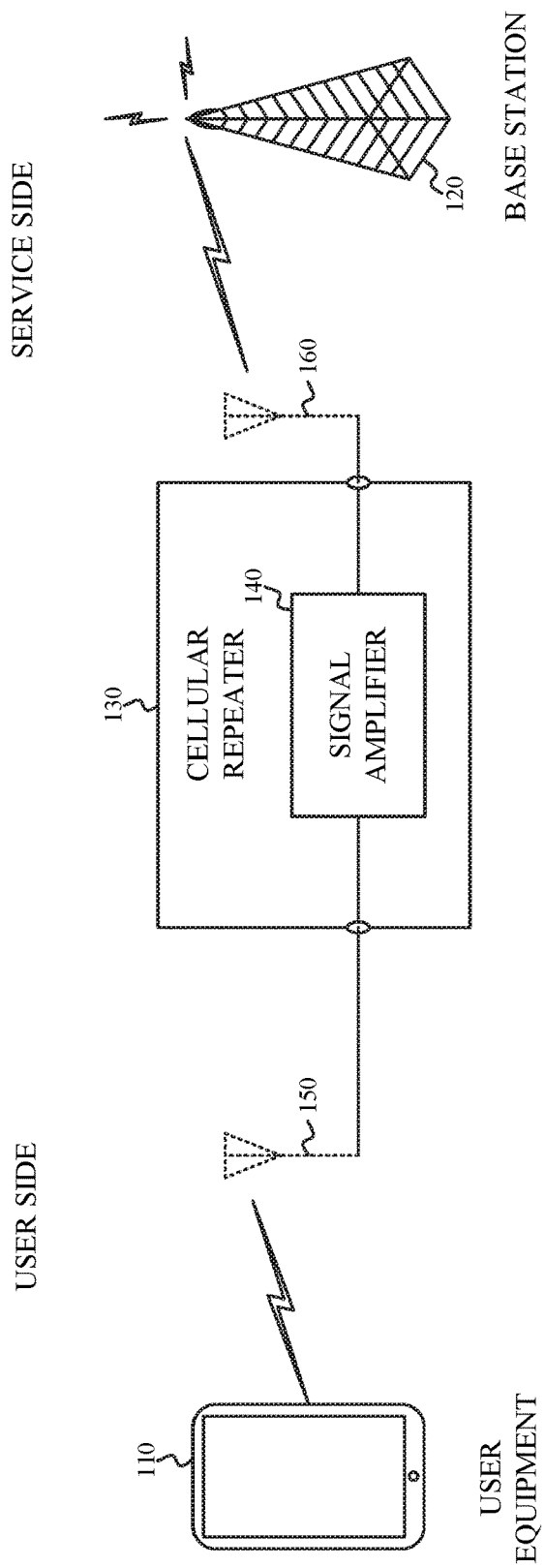
FIG. 1 depicts a wireless system, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION OF THE INVENTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, a multi-amplifier booster may include first and second repeaters configured to automatically receive, amplify and retransmit, on a bi-directional basis, the signals received from base, fixed, mobile, or portable stations, with no change in frequency or authorized bandwidth. The repeaters can provide improved wireless coverage within a limited area, such as a home, car, boat or recreational vehicle (RV). The repeaters can operate on the frequencies and in the market areas of a specified licensee service provider, or on the frequencies or in the market areas of multiple licensee service providers. The repeaters can operate in a fixed location, such as a house or building, or in a moving vehicle such as a car, truck or boat.

In one aspect, the multi-amplifier repeaters for a wireless communication system can use Radio Frequency (RF) reference signals or RF communication signals to determine the transmission loss across a RF wired signal path coupling the repeater. In one aspect, a first repeater and second repeater are coupled together by the RF wired signal path. The second repeater can include a bi-directional amplifier and a signal generator. The first repeater can include a bi-directional amplifier, a transmission loss detector and a gain controller. The bi-directional amplifiers of the first and second repeaters can amplify the RF communication signals between a cellular telephone Base Station (BS) and Use Equipment (UE).

The signal generator of the second repeater can generate RF reference signals at a predetermined amplitude or power for transmission across the RF wired signal path to the first repeater. The transmission loss detector of the first repeater can determine a transmission loss across the RF wired signal path based on the amplitude or power of the received RF reference signals. The gain controller of the first repeater can adjust a gain or noise power of the amplifier of one or both of the repeaters to compensate for the determined transmission loss across the RF wired signal path. The gain or noise power adjustment advantageously enables the repeaters to comply with constrains set by a government agency, an industry standard, or similar regulatory agency, while offsetting the transmission loss across the RF wired signal path coupling the repeaters together. In addition, the RF reference signals can be used to calibrate one or both of the amplifiers, while the repeaters can continuously amplify the RF communication signals.

In another aspect, the second repeater can include a bi-directional amplifier and a signal detector. The first repeater can include a bi-directional amplifier, a transmission loss detector and a gain controller. The signal detector of the second repeater can determine the amplitude or power of the RF communication signals as received at the second repeater. The transmission loss detector of the first repeater can determine the transmission loss across the RF wired signal path based upon the amplitude or power of the RF communication signals as received at the second repeater and the first repeater. The gain controller of the first repeater can adjust the gain or noise power of the amplifier of one or both of the repeaters to compensate for the determined transmission loss across the RF wired signal path. The gain or noise power adjustment again advantageously enables the repeaters to comply with constrains set by a government agency, an industry standard, or similar regulatory agency, while offsetting the transmission loss across the RF wired signal path coupling the repeaters together. In addition, the RF communication signals can be used to calibrate one or both of the amplifiers, while the repeaters can continuously amplify the RF communication signals.

Figure 2:
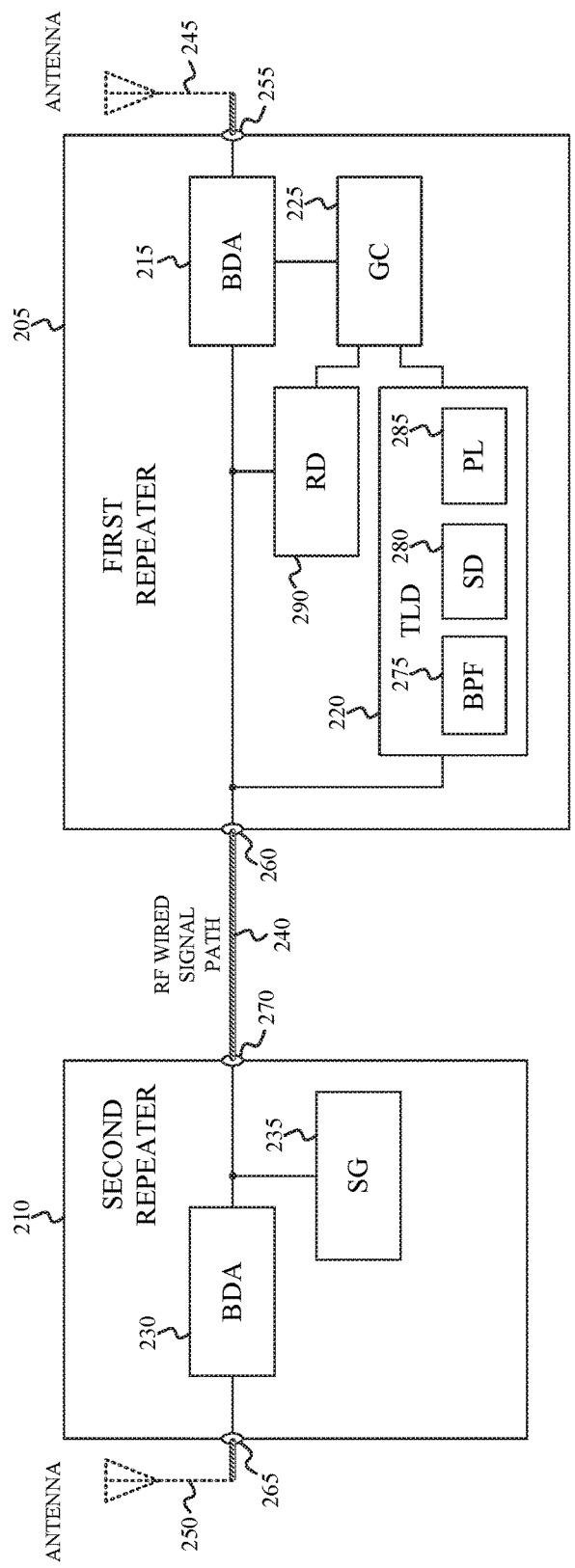
FIG. 2 depicts a wireless system, in accordance with an example.

FIG. 2 depicts a wireless system, in accordance with an example. In one aspect, the wireless system includes a first repeater 205 and a second repeater 210. In one aspect, the various functions of the repeaters 205, 210 can be implemented in hardware, firmware, software stored in memory and executed by one or more processing units, and/or any combination thereof.

In one aspect, the first repeater 205 can include an amplifier (BDA) 215, a transmission loss detector (TLD) 220, and a gain controller (GC) 225. The second repeater 210 can include an amplifier (BDA) 230 and a signal generator (SG) 235. The first and second repeaters 205, 210 can be coupled by a Radio Frequency (RF) wired signal path 240. In one instance, the RF wired signal path 240 can be a coaxial cable.

In one aspect, the amplifiers 205, 210 of both the first and second repeaters 205, 210 can be configured to amplify one or more RF communication signals. In one instance, the RF communication signals can be cellular telephone RF signals, such as a Third Generation Partnership Project (3GPP) Long Term Evolved (LTE) signals. In one instance, the amplifiers 205, 210 can be bi-direction amplifiers configured to amplify both uplink and downlink 3GPP LTE signals. In one instance, the uplink 3GPP LTE signals may operate at a first frequency band and the downlink 3GPP LTE signal may operate at a second frequency band. In one instance the operating bands of the RF communication signals may include:

In one aspect, the signal generator 235 of the second repeater 210 can be configured to generate one or more RF reference signals on the RF wired signal path 240. In one instance, the signal generator 235 can generate the RF reference signals having one or more attributes with predetermined values. The one or more attributes can include a predetermined amplitude of the carrier wave, a predetermined power of the carrier wave, and predetermined carrier wave frequency of the RF reference signal. In one instance, each of one or more frequency bands of the one or more RF reference signals can be outside each of one or more frequency bands of the one or more RF communication signals. In one instance, the frequency band of a first RF reference signal can be below the frequency bands of the RF communication signals, and the frequency band of a second RF reference signal can be above the frequency bands of the RF communication signals. In one instance, the frequency of the first and second RF reference signals can be as little as 2-3 megahertz (MHz) or as much as 50-60 MHz below and above the downlink and uplink 3GPP LTE signals.

In one aspect, the transmission loss detector 220 of the first repeater 205 can be configured to determine a transmission loss across the RF wired signal path 240 for the one or more RF reference signals. In one instance, the transmission loss detector 220 can receive at the RF wired signal path-side port 260 of the first repeater 205 the one or more RF reference signals transmitted across the RF wired signal path 240 from the signal generator 235 of the second repeater 210. In one instance, the transmission loss detector 220 can be configured to determine the transmission loss from the one or more received RF reference signals as measured at the RF wired signal path-side port 260 of the first repeater 205.

In one aspect, the transmission loss detector 220 can include bandpass filters (BPF) 275, signal detectors (SD) 280, and processing logic (PL) 285. In one aspect, the bandpass filters 275 can be configured to pass the RF reference signal received at the RF wired signal path-side port 260 to the signal detectors 280, while filtering out signals of other frequencies (e.g., RF communication signals) outside its passband. In one instance, the bandpass filters 275 of the transmission loss detectors 220 can attenuate frequencies outside the frequency band of the RF reference signals by 10-20 decibels (dB).

In one aspect, the signal detectors 280 can be configured to determine one or more attribute values of the RF reference signals passed by the bandpass filters 275. In one instance, the one or more attribute values can include the amplitude or power of the RF reference signals passed by the bandpass filters 275.

In one aspect, the processing logic 285 can be configured to determine the transmission loss based upon a difference between the determined one or more attribute values of the

TABLE 1

| | Bands of Operation | | | | |
|---|---|---|---|---|---|
| | Uplink | | | Downlink | |
| Band | Fmin (MHz) | Fmax (MHz) | Fc (MHz) | Fmin (MHz) Fmax (MHz) | Fc (MHz) |
| II | 1850.0-1910.0 | | 1880.0 | 1930.0-1990.0 | 1960.0 |
| IV | 1710.0-1755.0 | | 1732.5 | 2110.0-2155.0 | 2132.5 |
| V | 824.0-849.0 | | 836.5 | 869.0-894.0 | 881.5 |
| XII | 699.0-716.0 | | 707.5 | 729.0-746.0 | 737.5 |
| XIII | 776.0-787.0 | | 781.5 | 746.0-757.0 | 751.5 |

RF reference signals determined by the signal detectors 280 of the first repeater 205 and the corresponding predetermined attribute values of the RF reference signal generated by the signal generator 235 of the second repeater 210. In one instance, the transmission loss can be determined based upon the difference between the predetermined power level of the RF reference signals as generated and the determined power of the RF reference signals as received.

In one aspect, the transmission loss across the RF wired signal path 240 can vary depending upon the frequency of the signals propagating across the RF wired signal path 240. In one instance, therefore, the transmission loss across the RF wired signal path 240 for the RF communication signals can be extrapolated from the transmission loss determined based upon the RF reference signals which are below and above the frequency bands of the one or more RF communication signals.

In one aspect, the gain controller 225 can be configured to adjust a gain or noise power of the amplifier 215 of the first repeater 205 based on the determined transmission loss across the RF wired signal path 240. In some instances, the gain or noise power as measured at the port of the repeaters can be constrained by a government agency, an industry standard, or similar regulatory entity. Accordingly, the gain controller 225 can be configured to adjust the gain or noise power of the amplifier 215 as measured at the user-side-side port 260 of the first repeater 205 to comply with such constrains while offsetting the determined transmission loss of the one or more RF reference signals across the RF wired signal path 240. In one aspect, the gain controller 225 can be configured to control the uplink and downlink power supplied by the amplifier 215 independently.

In another aspect, the gain controller 225 of the first repeater 205 can be configured to adjust a gain or noise power of the amplifier 230 of the second repeater 210 based on the determined transmission loss across the RF wired signal path 240. If the gain controller 225 of the first repeater 205 is configured to adjust a gain or noise power of the amplifier 230 of the second repeater 210, one or more corresponding controls signals can be transmitted from the gain controller 225 of the first repeater 205 to the amplifier 230 of the second repeater 210 across a corresponding communication link (not illustrated) or can be transmitted across the RF wired signal path 240.

In one aspect, the first repeater 205 can optionally include a repeater detector (RD) 290 adapted to determine if the first repeater 205 is coupled to the second repeater 210 by the RF wired signal path 240. In one instance the repeater detector 290 can determine if the first repeater 205 is coupled to the second repeater 210 by the RF wired signal path 240 based upon an impedance measured at the RF wired signal path-side port 260 of the first repeater 205. In one aspect, the repeater detector 290 can be configured to control the gain controller 225 to adjust the gain or noise power of the amplifier 215 of the first repeater 205 based on the determined transmission loss across the RF wired signal path 240 when the repeater detector 290 determines that the first repeater 205 is coupled to the second repeater 210.

The optional repeater detector 290 can be advantageously employed when the repeaters are used alone to boost RF communication signals, or as a combination of a first and second repeater 205, 210 as described above. In an instance where a single repeater is employed, the repeater detector 290 and gain controller 225 can operate to control the amplifier 215 to apply a predetermined amount of gain or noise power to the RF communication signal as constrained by a government agency, an industry standard, or similar regulatory entity. Accordingly, the single repeater can operate in a standalone mode. In the instance where a second repeater 210 is used in combination with a first repeater 205, the repeater detector 290 and gain controller 225 can operate to adjust the amount of gain or noise power applied by the amplifier 215 to comply with such constrains while offsetting the determined transmission loss across the RF wired signal path 240 coupling the first and second repeaters 205, 210. Accordingly, the two repeater can operate in a cooperating mode.

In one instance, the amplifier 215 of the first repeater 205 can be coupled between a first port 255 and a second port 260 of the first repeater 205. The antenna 245 can be coupled to the first port 255 of the first repeater 205. The amplifier 230 of the second repeater 210 can be coupled between a first port 265 and second port 270 of the second repeater 210. The antenna 250 can be coupled to the first port 265 of the second repeater 210. The second port 260 of the first repeater 205 can be coupled to one end of the RF wired signal path 240, and the second port 270 of the second repeater 210 can be coupled to the other end of the RF wired signal path 240.

In one aspect, antennas can be integral to one or both of the first and second repeaters 205, 210. In another aspect, one or both repeaters 205, 210 can be located close to its respective antenna 245, 250. Locating the amplifier of a given repeater close to its respective antenna effectively removes the signal propagation losses between the repeaters from limitations on repeater performance caused by compliance with applicable government agency, industry standard, or similar regulatory agency imposed constraints.

In one aspect, one or both repeaters 205, 210 can include multiple ports for coupling to one or more antennas. In one instance, the first repeater 205 can include multiple donor ports to allow multiple donor antennas to be connected. The multiple donor antennas can be used for improving wireless communications within a customer premise. In another instance, the second repeater 210 can include multiple server ports to allow multiple server antennas to be connected. The multiple server antennas can be used for improving base station reception.

In one aspect, a repeater including multiple ports can include a repeater detector for each port to determine which ports are connected to another repeater or an antenna. In one aspect, the gain control logic can also be configured to adjust the gain or noise power at each port independent.

In one aspect, the second repeater 210 can be a main-line repeater and the first repeater 205 can be an in-line or remote repeater. The first and second repeaters may also be referred to as server and donor booster units respectively. In one instance, the amplifier 215 of the in-line repeater 205 can be coupled between a donor antenna 245 and the RF wired signal path 240, and the amplifier 230 of the main-line repeater 210 can be coupled between a server antenna 250 and the RF wired signal path 240. In another instance, the amplifier 215 of the in-line repeater 205 can be coupled between the server antenna and the RF wired signal path 240, and the amplifier 230 of the main-line repeater can be coupled between the donor antenna and the RF wired signal path.

In another aspect, the first repeater 205 can be the main-line repeater and the second repeater 210 can be an in-line or remote repeater. In one instance, the amplifier 215 of the main-line repeater 205 can be coupled between a donor antenna 245 and the RF wired signal path 240, and the amplifier 230 of the in-line repeater 210 can be coupled between a server antenna 250 and the RF wired signal path 240. In another instance, the amplifier 215 of the main-line repeater 205 can be coupled between the server antenna and the RF wired signal path 240, and the amplifier 230 of the in-line repeater 210 can be coupled between the donor antenna and the RF wired signal path.

The BS can be a node of a mobile phone network, such as a 3GPP LTE evolved NodeB (eNB). The UE can be a computing device capable of wireless digital communication such as a smart phone, a tablet computing device, a laptop computer, a multimedia device such as a television or gaming system, an internet of things (IOT) device, or other type of computing device that is configured to provide text, voice, data, or other types of digital or analog communication over wireless communication.

Figure 3:
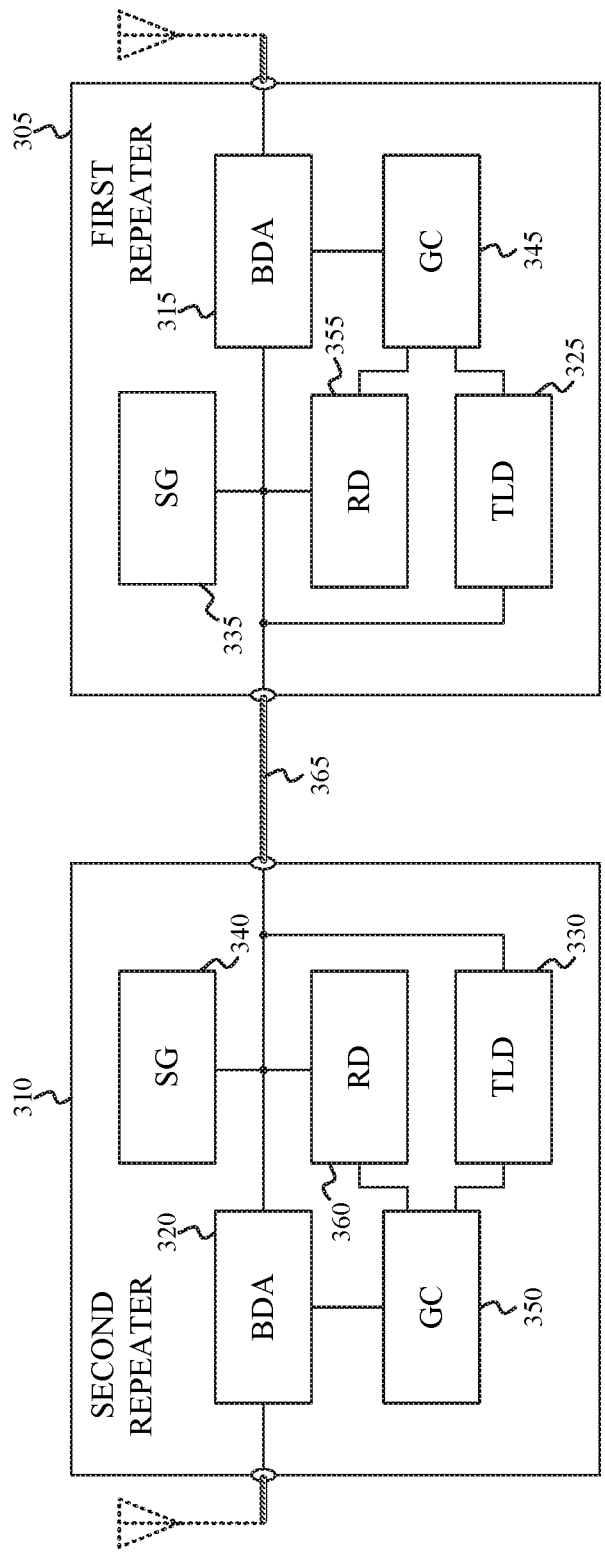
FIG. 3 depicts a wireless system, in accordance with another example.

FIG. 3 depicts a wireless system, in accordance with another example. The first and second repeaters 305, 310 of the wireless system can each include an amplifier (BDA) 315, 320, a transmission loss detector (TLD) 325, 330, a signal generator (SG) 335, 340, and a gain controller (GC) 345, 350. The first and second repeaters 305, 310 can also optionally each include a repeater detector (RD) 355, 360. The amplifiers 315, 320, transmission loss detectors 325, 330, signal generators 335, 340, gain controllers 345, 350, and the optional repeater detectors 355, 360, can function as described above with regard to FIG. 2. The wireless system of FIG. 3 can be configured to adjust the gain or noise power of the amplifier of the first repeater 305, the second repeater 310, or both to comply with constrains set by a government agency, an industry standard, or similar regulatory agency, while offsetting the transmission loss across the RF wired signal path 365.

In one aspect, the gain controllers 345, 350 can be configured to control the power supplied by each repeater 305, 315 independently. In one instance, the gain control 345 of a given repeater 305 can set the gain or noise power of the corresponding amplifier 315 to a moderate predetermined value selected for a port connected to another repeater. The gain controller 350 of the other repeater 310 can set the gain or noise power of the corresponding amplifier 320 based on the given repeater's 305 amplifier gain or noise power set to the moderate predetermined value.

In one aspect, the second repeater 310 can be a main-line repeater and the first repeater 305 can be an in-line or remote repeater. In another aspect, the first repeater 305 can be the main-line repeater and the second repeater 310 can be an in-line or remote repeater.

Figure 4:
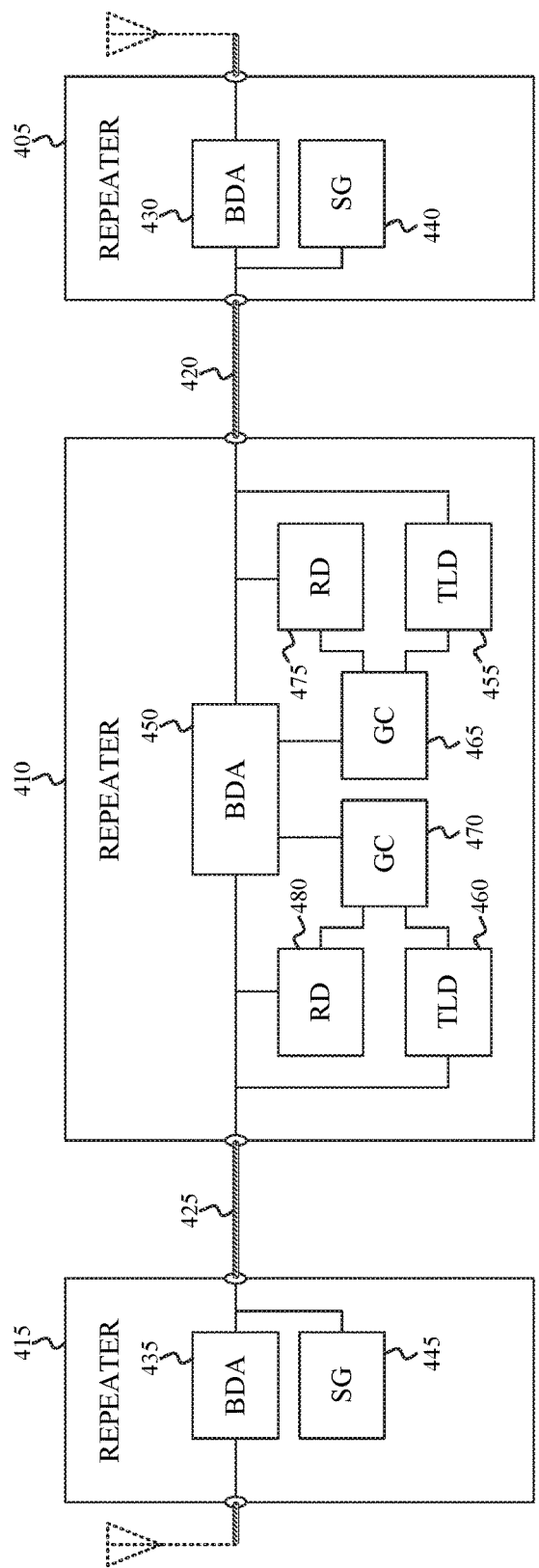
FIG. 4 depicts a wireless system, in accordance with yet another example.

FIG. 4 depicts a wireless system, in accordance with yet another example. In one aspect, the wireless system includes a first repeater 405, a second repeater 410 and a third repeater 415. The first and second repeaters 405, 410 can be coupled by a first RF wired signal path 420, while the second and third repeaters 410, 415 can be coupled by a second RF wired signal path 425. The first and third repeaters 405, 415 of the wireless system can each include an amplifier (BDA) 430, 435 and a signal generator (SG) 440, 445. The second repeater 410 can include an amplifier 450, a first and second transmission loss detector (TLD) 455, 460, a gain controller (GC) 465, 470, and optionally a first and second receiver detector (RD) 475, 480. The amplifiers 430, 435, 450, transmission loss detectors 455, 460, signal generators 440, 445, gain controllers 465, 470, and the optional repeater detectors 475, 480, can function as described above with regard to FIG. 2. The wireless system of FIG. 4 can be configured to adjust the gain or noise power of the amplifiers 430, 435 of the first and third repeaters 405, 415 to comply with constrains set by a government agency, an industry standard, or similar regulatory agency, while offsetting the transmission loss across the first and second RF wired signal paths 420, 425.

Numerous other configuration of the repeaters may also be implemented based upon the above teachings. For instance, any combination of the transmission loss detectors 455, 460, gain controller 465, 470, and/or repeater detectors 475, 480 can be implemented in the first and/or third repeaters 405, 415, or can be implemented in the first, second and third repeater 405, 410, 415. In another instance, a plurality of in-line repeaters can be coupled between respective donor antennas and a main-line repeater by respective RF wired signal paths. In another instance, a plurality of in-line repeater can be coupled between respective server antennas and a main-line repeater by respective RF wired signal paths. In yet another instance, a plurality of in-line repeaters can be coupled between respective donor antennas and a main-line repeater by respective RF wired signal paths, and a plurality of in-line repeater can be coupled between respective server antennas and the main-line repeater by respective RF wired signal paths.

Figure 5:
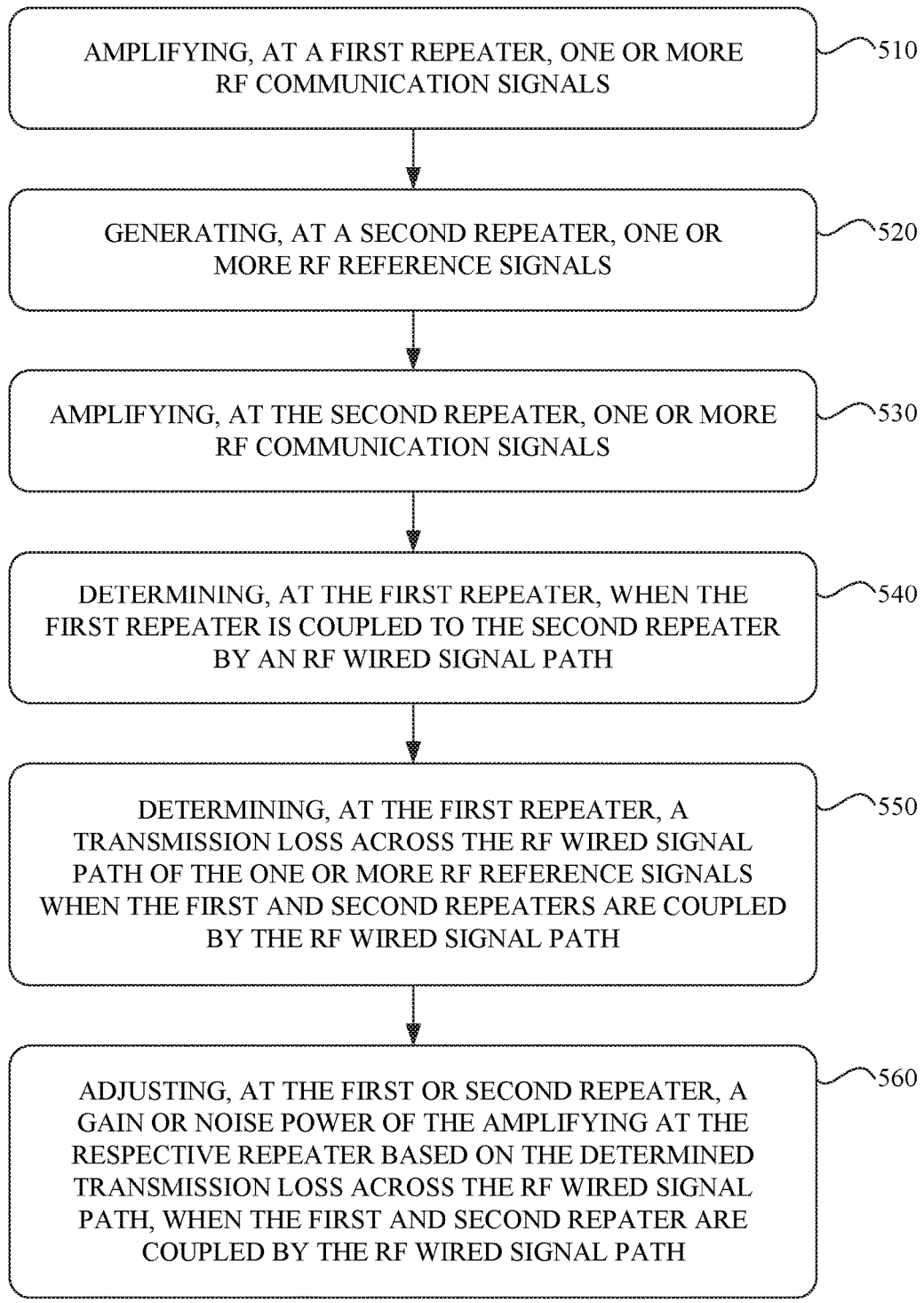
FIG. 5 depicts a wireless communication boost method, in accordance with an example.

FIG. 5 depicts a wireless communication boost method, in accordance with an example. In one aspect, one or more RF communication signals can be amplified at a first repeater 510. In one instance, the RF communication signals can be cellular telephone RF signals, such as a Third Generation Partnership Project (3GPP) Long Term Evolved (LTE) signal. In one, instance uplink and downlink 3GPP LTE signals can be amplified by the first repeater.

In one aspect, one or more RF reference signal are generated at a second repeater 520. In one instance, the frequency band of a first RF reference signal can be below the frequency bands of the uplink 3GPP LTE signals, and the frequency band of a second RF reference signal can be above the frequency bands of the downlink 3GPP LTE signals. In one instance, the RF reference signal is generated at a predetermined power level or predetermined voltage level.

In one aspect, the one or more RF communication signal can be amplified at the second repeater 530. In one instance, the 3GPP LTE signals can also be amplified by the second repeater.

In one aspect, the first repeater can determine when the first repeater is coupled to the second repeater by an RF wired signal path 540. In one instance, whether the first repeater is coupled to the second repeater can be determined based upon an impedance at a port of the first repeater adapted for coupling the first repeater to the second repeater by an RF wired signal path.

In one aspect, the first repeater can determine a transmission loss across the RF wired signal path of the one or more RF reference signals 550, when the first and second repeaters are determined to be coupled to the RF wired signal path. In one instance, the transmission loss can be determined from the power or voltage level of the RF reference signals received at the first repeater across the RF wired signal path from the second repeater, and the predetermined power or voltage level of the RF reference signals generated at the second repeater.

In one aspect, the first repeater can adjust the gain or noise power of the amplifying of the RF communication signals at the first repeater, at the second repeater or both based on the determined transmission loss across the RF wired signal path 560, when the first and second repeaters are determined to be coupled to the RF wired signal path. In one instance, the first amplifier adjusts the gain or noise power of an amplifier of the first and/or second amplifier to comply with constrains set by a government agency, an industry standard, or similar regulatory agency, while offsetting the transmission loss across the RF wired signal path.

In one aspect, the first repeater can be a main-line repeater and the second repeater can be an in-line or remote repeater. In another aspect, the second repeater can be a main-line repeater and the first repeater can be an in-line or remote repeater.

Accordingly, the gain or noise power of one or more of the repeaters can be advantageously adjusted using one or more out-of-band RF reference signals, while the repeaters can continuously amplify the RF communication signals. The adjustment of the gain or noise power advantageously enables the repeaters to comply with constrains set by a government agency, an industry standard, or similar regulatory agency, while offsetting the transmission loss across the RF wired signal path coupling the repeaters together. Accordingly, the first and second repeaters can advantageously operate like a single booster, wherein the transmission loss across the RF wired signal path can be compensated for by one or both of the first and second repeaters.

Figure 6:
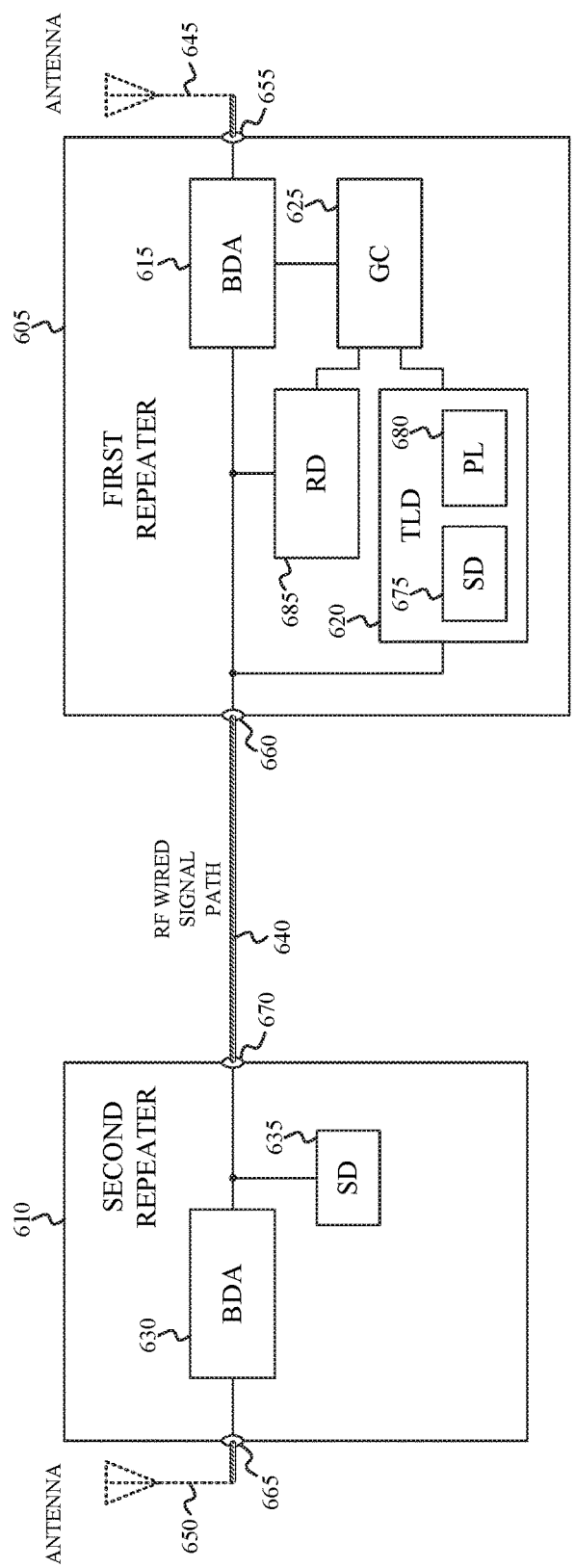
FIG. 6 depicts a wireless system, in accordance with an example.

FIG. 6 depicts a wireless system, in accordance with an example. In one aspect, the wireless system includes a first repeater 605 and a second repeater 610. In one aspect, the various functions of the repeaters 205, 210 can be implemented in hardware, firmware, software stored in memory and executed by one or more processing units, and/or any combination thereof.

In one aspect, the first repeater 605 can include an amplifier (BDA) 615, a transmission loss detector (TLD) 620, and a gain controller (GC) 625. The second repeater 610 can include an amplifier (BDA) 630 and a signal detector (SD) 635. The first and second repeaters 605, 610 can be coupled by a RF wired signal path 640. In one instance, the RF wired signal path 640 can be a coaxial cable.

In one aspect, the signal detector 635 of the second repeater 610 can be configured to sense the RF communication signal. In one aspect, the signal detector 635 can be configured to determine one or more attribute values of the RF communication signals and to send the determined one or more attribute values to the transmission loss detector 620 of the first repeater 605. In one instance, the one or more attribute values can include the amplitude or power of the RF communication signals. In one instance, the determined attribute values can be transmitted to the transmission loss detector 620 of the first repeater 605 across a corresponding communication link (not illustrated) or can be transmitted across the RF wired signal path 640.

In one aspect, the transmission loss detector 620 of the first repeater 605 can be configured to determine a transmission loss across the RF wired signal path 640 for the one or more RF communication signals. In one instance, the transmission loss detector 620 can be configured to determine the transmission loss as measured at the RF wired signal path-side port 660 of the first repeater 605.

In one aspect, the transmission loss detector 620 can include signal detectors 675 and processing logic (PL) 680. In one aspect, the signal detectors 675 can be configured to determine one or more attribute values of the RF communication signals at the first repeater 605. In one instance, the one or more attribute values can include the amplitude or power of the RF communication signals. In one aspect, the processing logic 680 can be configured to determine the transmission loss based upon a difference between the determined one or more attribute values of the RF communication signals at the signal detectors 675 of the first repeater 605 and the corresponding attribute values of the RF communication signals determined by the signal detectors 635 of the second repeater 610. The one or more attribute values can be time averaged values, or can be synchronously measured at the signal detectors 635, 675. In one instance, the transmission loss can be determined based upon the difference between the determined power of the RF communication signals at the first and second repeaters 605, 610.

In one aspect, the gain controller 625 can be configured to adjust a gain or noise power of the amplifier 615 of the first repeater 605 based on the determined transmission loss across the RF wired signal path 640. In some instances, the gain or noise power as measured at the port of the repeaters can be constrained by a government agency, an industry standard, or similar regulatory entity. Accordingly, the gain controller 625 can be configured to adjust the gain or noise power of the amplifier 615 of the first repeater 605 to comply with such constrains while offsetting the determined transmission loss across the RF wired signal path 640. In another aspect, the gain controller 625 of the first repeater 605 can be configured to adjust a gain or noise power of the amplifier 630 of the second repeater 210 based on the determined transmission loss across the RF wired signal path 640. If the gain controller 625 of the first repeater 605 is configured to adjust a gain or noise power of the amplifier 630 of the second repeater 610, one or more corresponding controls signals can be transmitted from the gain controller 625 of the first repeater 605 to the amplifier 630 of the second repeater 610 across a corresponding communication link (not illustrated) or can be transmitted across the RF wired signal path 640.

In one aspect, the first repeater 605 can optionally include a repeater detector 685 adapted to determine if the first repeater 605 is coupled to the second repeater 610 by the RF wired signal path 640. In one instance the repeater detector 685 can determine if the first repeater 605 is coupled to the second repeater 610 by the RF wired signal path 640 based upon an impedance measured at the RF wired signal path-side port 660 of the first repeater 605. In one aspect, the repeater detector 685 can be configured to control the gain controller 625 to adjust the gain or noise power of the amplifier 615 of the first repeater 605 based on the determined transmission loss of the one or more RF reference signals across the RF wired signal path 640 when the repeater detector 685 determines that the first repeater 605 is coupled to the second repeater 610.

The optional repeater detector 685 can be advantageously employed when the repeaters are used alone to boost RF communication signals, or as a combination of a first and second repeater 605, 610 as described above. In an instance where a single repeater is employed, the repeater detector 685 and gain controller 625 can operate to control the amplifier 615 to apply a predetermined amount of gain or noise power to the RF communication signal as constrained by a government agency, an industry standard, or similar regulatory entity. Accordingly, the single repeater can operate in a standalone mode. In the instance where a second repeater 610 is used in combination with a first repeater 605, the repeater detector 685 and gain controller 625 can operate to adjust the amount of gain or noise power applied by the amplifier 615 to comply with such constrains while offsetting the determined transmission loss across the RF wired signal path 640 coupling the first and second repeaters 605, 610. Accordingly, the two repeaters can operate in a cooperating mode.

In one instance, the amplifier 615 of the first repeater 605 can be coupled between a first port 655 and a second port 660 of the first repeater 605. The antenna 645 can be coupled to the first port 655 of the first repeater 605. The amplifier 630 of the second repeater 610 can be coupled between a first port 665 and second port 670 of the second repeater 610. The antenna 650 can be coupled to the first port 665 of the second repeater 610. The second port 660 of the first repeater 605 can be coupled to one end of the RF wired signal path 640, and the second port 670 of the second repeater 610 can be coupled to the other end of the RF wired signal path 640.

In one aspect, antennas can be integral to one or both of the first and second repeaters 605, 610. In another aspect, one or both repeaters 605, 610 can be located close to its respective antenna 645, 650. Locating the amplifier of a given repeater close to its respective antenna effectively removes the signal propagation losses between the repeaters from limitations on repeater performance caused by compliance with applicable government agency, industry standard, or similar regulatory agency imposed constraints.

In one aspect, one or both repeaters 605, 610 can include multiple ports for coupling to one or more antennas. In one instance, the first repeater 605 can include multiple donor ports to allow multiple donor antennas to be connected. The multiple donor antennas can be used for improving wireless communications within a customer premise. In another instance, the second repeater 610 can include multiple server ports to allow multiple server antennas to be connected. The multiple server antennas can be used for improving base station reception.

In one aspect, a repeater including multiple ports can include a repeater detector for each port to determine which ports are connected to another repeater or an antenna. In one aspect, the gain control logic can also be configured to adjust the gain or noise power at each port independent.

In one aspect, the second repeater 610 can be a main-line repeater and the first repeater 605 can be an in-line or remote repeater. The first and second repeaters 605, 610 may also be referred to as server and donor repeater units respectively. In one instance, the amplifier 615 of the in-line repeater 605 can be coupled between a donor antenna 645 and the RF wired signal path 640, and the amplifier 630 of the main-line repeater 610 can be coupled between a server antenna 650 and the RF wired signal path 640. In another instance, the amplifier 615 of the in-line repeater 605 can be coupled between the server antenna and the RF wired signal path 640, and the amplifier 630 of the main-line repeater can be coupled between the donor antenna and the RF wired signal path.

In another aspect, the first repeater 605 can be the main-line repeater and the second repeater 610 can be an in-line or remote repeater. In one instance, the amplifier 615 of the main-line repeater 605 can be coupled between a donor antenna 645 and the RF wired signal path 640, and the amplifier 630 of the in-line repeater 610 can be coupled between a server antenna 650 and the RF wired signal path 640. In another instance, the amplifier 615 of the main-line repeater 605 can be coupled between the server antenna and the RF wired signal path 640, and the amplifier 630 of the in-line repeater 610 can be coupled between the donor antenna and the RF wired signal path.

Figure 7:
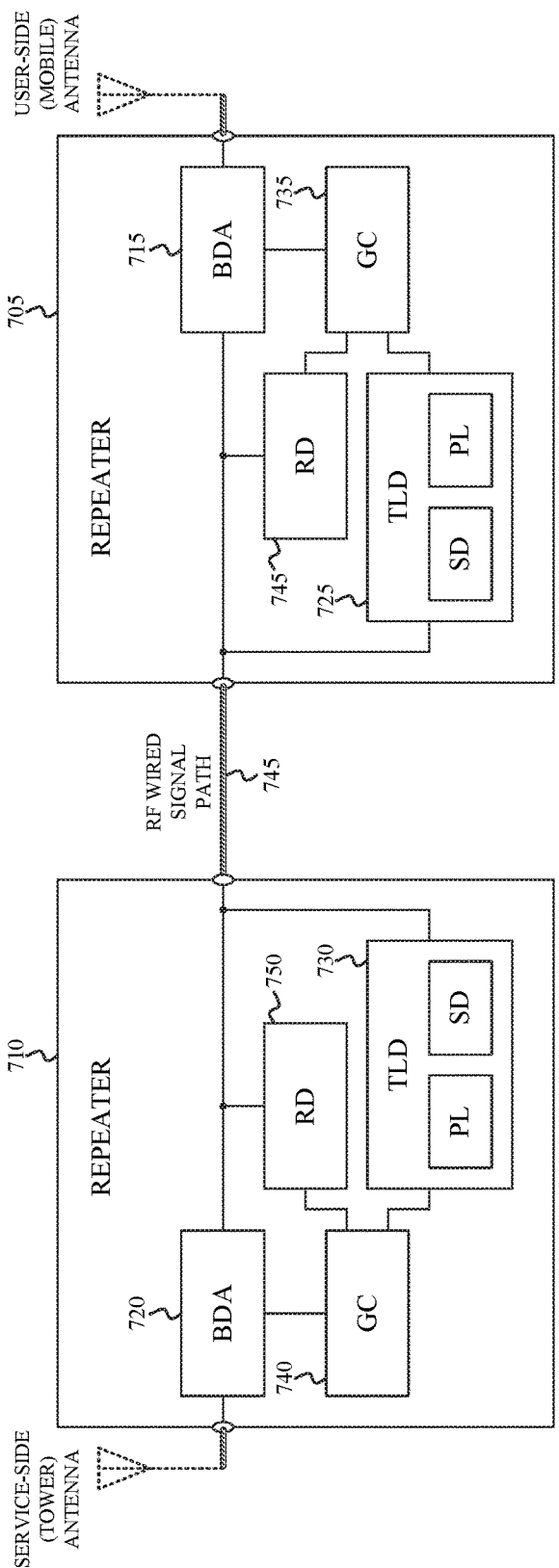
FIG. 7 depicts a wireless system, in accordance with another example.

FIG. 7 depicts a wireless system, in accordance with another example. The first and second repeaters 705, 710 of the wireless system can each include an amplifier (BDA) 715, 720, a transmission loss detector (TLD) 725, 730, and a gain controller (GC) 735, 740. The first and second repeaters 705, 710 can also each include an optional repeater detector (RD) 745, 750. The amplifiers 715, 720, transmission loss detectors 725, 730, gain controllers 735, 740, and the optional repeater detectors 745, 750, can function as described above with regard to FIG. 6. The signal detectors 755, 760 of the transmission loss detectors 725, 730 share the detected parameter values of the RC communication signals with the transmission loss detector of the other repeater. The wireless system of FIG. 7 can therefore be configured to adjust the gain or noise power of the amplifier of the first repeater 705, the second repeater 710, or both to comply with constrains set by a government agency, an industry standard, or similar regulatory agency, while offsetting the transmission loss across the RF wired signal path 745.

In one aspect, the gain controllers 735, 740 can be configured to control the power supplied by each repeater 710, 715 independently. In one instance, the gain controller 740 of a given repeater 710 can set the gain or noise power of the corresponding amplifier 720 to a moderate predetermined value selected for a port connected to another repeater. The gain controller 735 of the other repeater can set the gain or noise power of the corresponding amplifier 715 based on given repeater's 710 amplifier gain or noise power set to the moderate predetermined value.

In one aspect, the second repeater 710 can be a main-line repeater and the first repeater 705 can be an in-line or remote repeater. In another aspect, the first repeater 705 can be the main-line repeater and the second repeater 710 can be an in-line or remote repeater.

Figure 8:
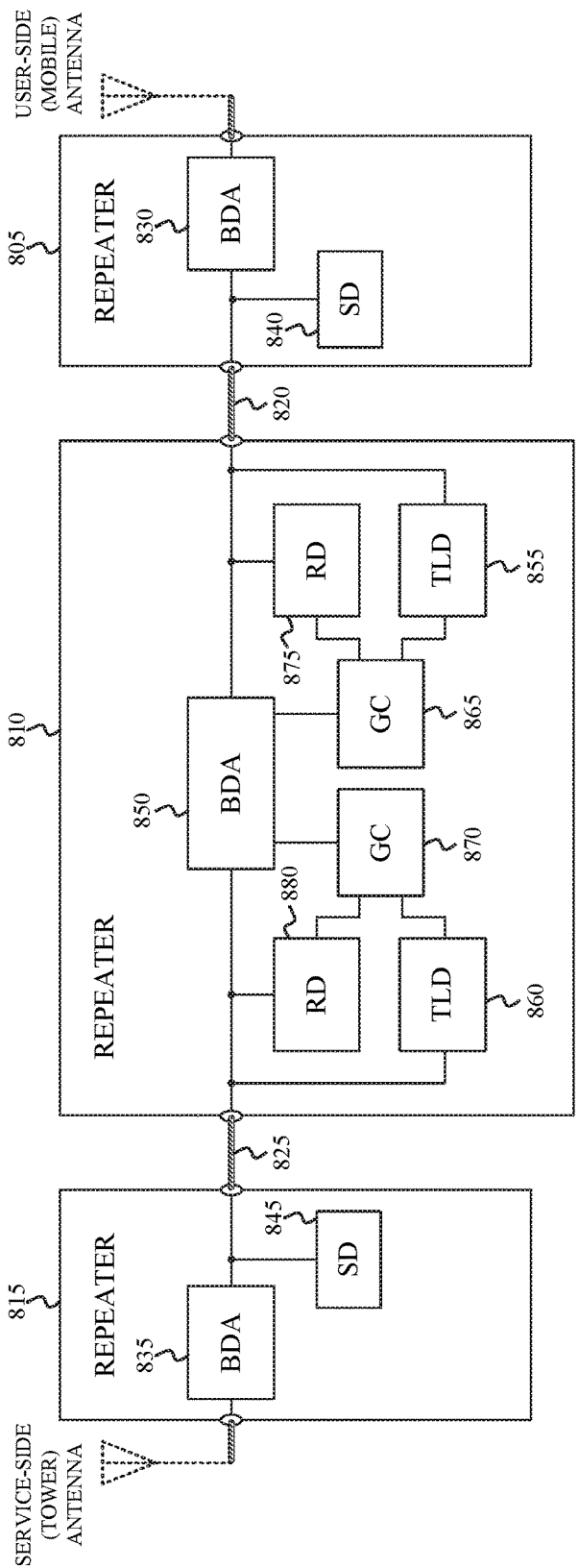
FIG. 8 depicts a wireless system, in accordance with yet another example.

FIG. 8 depicts a wireless system, in accordance with yet another example. In one aspect, the wireless system includes a first repeater 805, a second repeater 810 and a third repeater 815. The first and second repeaters 805, 810 can be coupled by a first RF wired signal path 820, while the second and third repeaters 810, 815 can be coupled by a second RF wired signal path 825. The first and third repeaters 805, 815 of the wireless system can each include an amplifier (BDA) 830, 835, and a signal detector (SD) 840, 845. The second repeater 810 can include, an amplifier 850, a first and second transmission loss detector (TLD) 855, 860, a first and second gain controller (GC) 865, 870, and optionally a first and second receiver detector (RD) 875, 880. The amplifiers 830, 835, 850, signal detectors 840, 845, transmission loss detectors 855, 860, gain controllers 865, 870, and the optional repeater detectors 875, 880, can function as described above with regard to FIG. 6. The wireless system of FIG. 8 can be configured to adjust the gain or noise power of the amplifier 830, 835 of the first and third repeaters 805, 815 to comply with constrains set by a government agency, an industry standard, or similar regulatory agency, while offsetting the transmission loss across the first and second RF wired signal paths 820, 825.

Numerous other configuration of the repeaters may also be implemented based upon the above teachings. For instance, any combination of the transmission loss detectors 855, 860, gain controller 865, 870, and/or repeater detectors 875, 880 can be implemented in the first and/or third repeaters 805, 815, or can be implemented in the first, second and third repeater 805, 810, 815. In another instance, a plurality of in-line repeaters can be coupled between respective donor antennas and a main-line repeater by respective RF wired signal paths. In another instance, a plurality of in-line repeater can be coupled between respective server antennas and a main-line repeater by respective RF wired signal paths. In yet another instance, a plurality of in-line repeaters can be coupled between respective donor antennas and a main-line repeater by respective RF wired signal paths, and a plurality of in-line repeater can be coupled between respective server antennas and the main-line repeater by respective RF wired signal paths.

Figure 9:
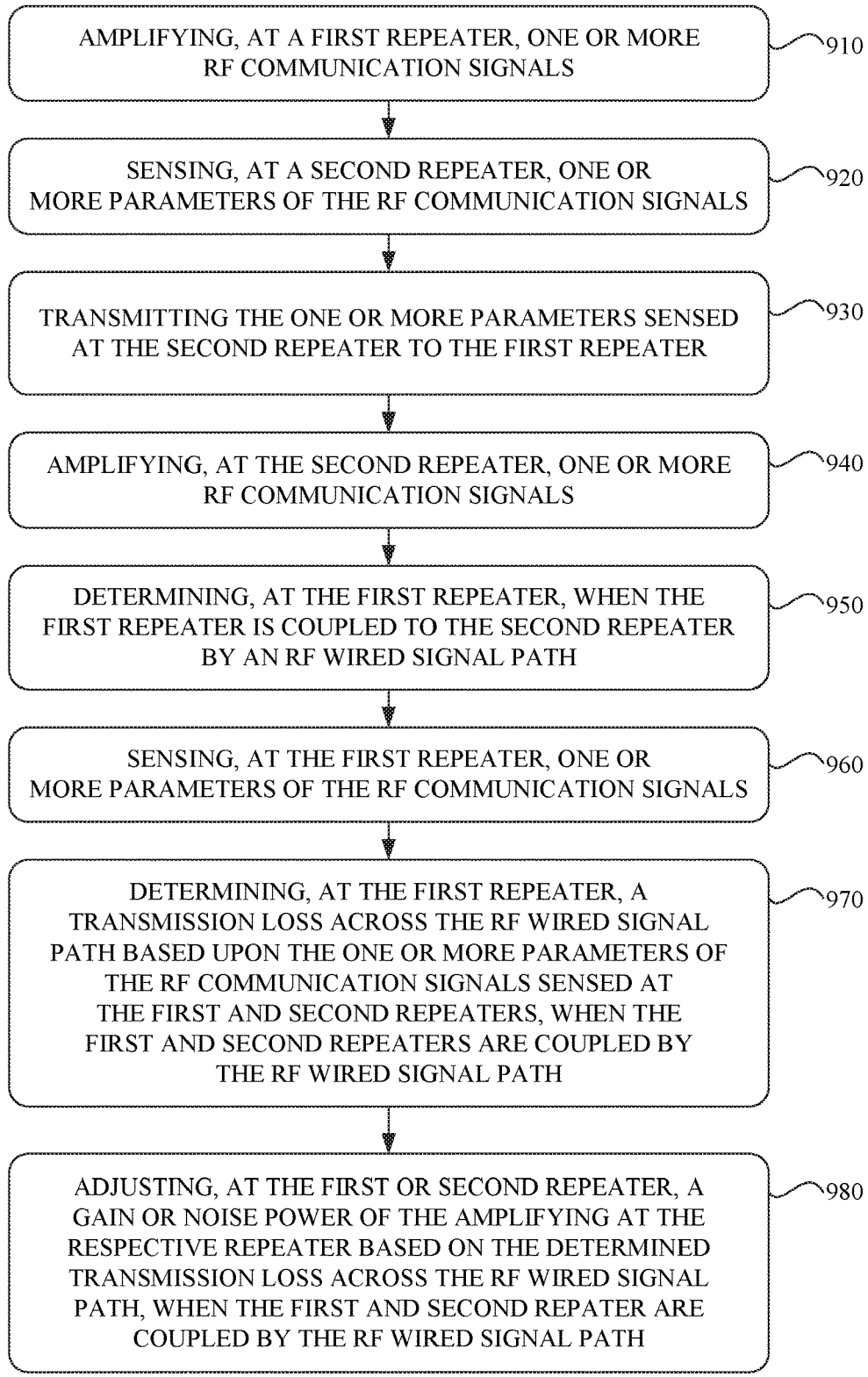
FIG. 9 depicts a wireless communication boost method, in accordance with an example.

FIG. 9 depicts a wireless communication boost method, in accordance with an example. In one aspect, one or more RF communication signals can be amplified at a first repeater 910. In one instance, the RF communication signals can be cellular telephone RF signals, such as a Third Generation Partnership Project (3GPP) Long Term Evolved (LTE) signal. In one, instance uplink and downlink 3GPP LTE signals can be amplified by the first repeater.

In one aspect, one or more parameters of the RF communication signals can be sensed at the second repeater 920. In one instance, the amplitude or power of the RF communication signals can be determined by the second repeater. In one aspect, the one or more parameters sensed at the second repeater can be transmitted to the first repeater 930.

In one aspect, the one or more RF communication signal can be amplified at a second repeater 940. In one instance, the 3GPP LTE signals can also be amplified by the in-line repeater.

In one aspect, the first repeater can determine when the first repeater is coupled to the second repeater by an RF wired signal path 950. In one instance, whether the first repeater is coupled to the second repeater can be determined based upon an impedance at a port of the first repeater adapted for coupling the first repeater to the second repeater by an RF wired signal path.

In one aspect, one or more parameters of the RF communication signals can be sensed at the first repeater 960. In one instance, the amplitude or power of the RF communication signals can be determined by the first repeater.

In one aspect, the first repeater can determine a transmission loss across the RF wired signal path based upon the one or more parameters of the RF communication signal sensed at the first and second repeaters 970, when the first and second repeaters are determined to be coupled to the RF wired signal path. In one instance, the transmission loss can be determined from the power or voltage level of the RF communication signals determined at the first and second repeaters.

In one aspect, the first repeater can adjust the gain or noise power of the amplifying of the RF communication signals at the first repeater, at the second repeater, or both based on the determined transmission loss across the RF wired signal path 980, when the first and second repeaters are determined to be coupled to the RF wired signal path. In one instance, the first amplifier adjusts the gain or noise power of an amplifier of the first and/or second amplifier to comply with constrains set by a government agency, an industry standard, or similar regulatory agency, while offsetting the transmission loss across the RF wired signal path.

In one aspect, the first repeater can be a main-line repeater and the second repeater can be an in-line or remote repeater. In another aspect, the second repeater can be a main-line repeater and the first repeater can be an in-line or remote repeater.

Accordingly, the gain or noise power of one or more of the repeaters can be advantageously adjusted using RF communication signals, while the repeaters can continuously amplify the RF communication signals. The adjustment of the gain or noise power advantageously enables the repeaters to comply with constrains set by a government agency, an industry standard, or similar regulatory agency, while offsetting the transmission loss across the RF wired signal path coupling the repeaters together. Accordingly, the first and second repeaters can advantageously operate like a single booster, wherein the transmission loss across the RF wired signal path can be compensated for by one or both of the first and second repeaters.

EXAMPLES

The following examples pertain to specific technology embodiments and point out specific features, elements, or steps that may be used or otherwise combined in achieving such embodiments.

Embodiment 1 includes a system comprising: a first repeater including; an amplifier configured to amplify one or more Radio Frequency (RF) communication signals; a transmission loss detector configured to determine a transmission loss of one or more RF reference signals across a RF wired signal path, wherein frequency bands of the one or more RF reference signals are outside frequency bands of the one or more RF communication signals; and a gain controller configured to adjust a gain or noise power of the amplifier of the first repeater or a second repeater based on the determined transmission loss across the RF wired signal path; and the second repeater, coupled to the first repeater by the RF wired signal path, the second repeater including; an amplifier configured to amplify the one or more RF communication signals; and a signal generator configured to generate the one or more RF reference signals at a predetermined amplitude or power.

Embodiment 2 includes the system of embodiment 1, wherein frequency bands of the one or more RF reference signals are outside frequency bands of the one or more RF communication signals to permit continuous amplifying the one or more RF communication signals while determining the transmission loss.

Embodiment 3 includes the system of embodiment 1, wherein the transmission loss detector comprises: a bandpass filter configured to pass the one or more RF reference signals and attenuate the one or more RF communication signals; a signal detector configured to determine an amplitude or power of the one or more RF reference signals as received at a port of the first repeater; and a processing logic configured to determine the transmission loss of the one or more RF reference signals across the RF wired signal path based on the predetermined amplitude or power of the one or more RF reference signals and the amplitude or power of the one or more RF reference signals as received at the port of the first repeater.

Embodiment 4 includes the system of embodiment 1, wherein the gain controller of the first repeater is configured to adjust the gain or noise power of the amplifier of the first repeater or second repeater to comply with an output constraint while offsetting at least a portion of the determined transmission loss across the RF wired signal path.

Embodiment 5 includes the system of embodiment 4, wherein the output constraint is based on a regulatory standard.

Embodiment 6 includes the system of embodiment 1, wherein the one or more RF communication signals includes an uplink Third Generation Partnership Project (3GPP) Long Term Evolved (LTE) signal and a downlink 3GPP LTE signal.

Embodiment 7 includes the system of embodiment 6, wherein a frequency band of a first of the one or more RF reference signals is below a frequency band of the uplink 3GPP LTE signal and a frequency band of a second of the one or more RF reference signals is above a frequency band of the downlink 3GPP LTE signal.

Embodiment 8 includes the system of embodiment 1, wherein the first repeater further includes: a repeater detector configured to determine if when the first repeater is coupled to the second repeater by the RF wired signal path for transmitting the one or more RF communication signals and one or more RF reference signals; and the gain controller further configured to adjust the gain or noise power of the amplifier of the first repeater or the second repeater based on the determined transmission loss across a RF wired signal path if when the first repeater is determined to be coupled to the second repeater by the RF wired signal path.

Embodiment 9 includes the system of embodiment 1, further comprising: one or more user-side donor antennas coupled to the first repeater; and one or more service-side server antennas coupled to the second repeater.

Embodiment 10 includes the system of embodiment 1, further comprising: one or more service-side server antennas coupled to the first repeater; and one or more user-side donor antennas coupled to the second repeater.

Embodiment 11 includes the system of embodiment 1, wherein the RF wired signal path comprises a coaxial cable.

Embodiment 12 includes a repeater comprising one or more processors and memory configured to: amplify one or more Radio Frequency (RF) communication signals; determine a transmission loss of one or more RF reference signals across a RF wired signal path coupling the repeater to another repeater, wherein frequency bands of the one or more RF reference signals are outside frequency bands of the one or more RF communication signals; and adjust a gain or noise power of amplifying the one or more RF communication signals based on the determined transmission loss across the RF wired signal path.

Embodiment 13 includes the repeater of embodiment 12, wherein determining the transmission loss includes: filter to pass the one or more RF reference signals and attenuate the one or more RF communication signals; determine an amplitude or power of the one or more RF reference signals as received at a port of the repeater; and determine the transmission loss of one or more RF reference signals across the RF wired signal path based on the amplitude or power of the one or more RF reference signals as received at the port of the repeater.

Embodiment 14 includes the repeater of embodiment 12, wherein the one or more processors and memory are further configured to: determine if when the repeater is coupled to the another repeater by the RF wired signal path; and adjust the gain or noise power of amplifying the one or more RF communication signals based on the determined transmission loss across the RF wired signal path, if when the repeater is determined to be coupled to the another repeater by the RF wired signal path.

Embodiment 15 includes the repeater of embodiment 12, wherein the gain or noise power of amplifying the one or more RF communication signals is adjusted to comply with an output constraint while offsetting at least a portion of the determined transmission loss across the RF wired signal path.

Embodiment 16 includes the repeater of embodiment 15, wherein the output constraint is based on a regulatory standard.

Embodiment 17 includes the repeater of embodiment 12, wherein frequency bands of the one or more RF reference signals are outside frequency bands of the one or more RF communication signals to permit continuous amplifying the one or more RF communication signals while determining the transmission loss.

Embodiment 18 includes the repeater of embodiment 12, wherein the RF wired signal path comprises a coaxial cable.

Embodiment 19 includes a system comprising: a first repeater including; an amplifier configured to amplify one or more Radio Frequency (RF) communication signals; a transmission loss detector configured to determine a transmission loss across a RF wired signal path based upon an amplitude or power of the one or more RF communication signals as received at a second repeater and an amplitude or power of the one or more RF communication signals as received at the first repeater; and a gain controller configured to adjust a gain or noise power of the amplifier of the first repeater or the second repeater based on the determined transmission loss across the RF wired signal path; and the second repeater, coupled to the first repeater by the RF wired signal path, the second repeater including; an amplifier configured to amplify the one or more RF communication signals; and a signal detector configured to determine the amplitude or power of the one or more RF communication signals as received at the second repeater.

Embodiment 20 includes the system of embodiment 19, wherein the transmission loss detector comprises: a signal detector configured to determine the amplitude or power of the one or more RF communication signals as received at the first repeater; and a processing logic configured to determine the transmission loss across the RF wired signal path based on a difference between the amplitude or power of the one or more RF communication signals as received at the second repeater and the amplitude or power of the one or more RF communication signals as received at the first repeater.

Embodiment 21 includes the system of embodiment 19, wherein the gain controller of the first repeater is configured to adjust the gain or noise power of the amplifier of the first repeater or the second repeater to comply with an output constraint while offsetting at least a portion of the determined transmission loss across the RF wired signal path.

Embodiment 22 includes the system of embodiment 21, wherein the output constraint is based on a regulatory standard.

Embodiment 23 includes the system of embodiment 19, wherein the one or more RF communication signals includes an uplink Third Generation Partnership Project (3GPP) Long Term Evolved (LTE) signal and a downlink 3GPP LTE signal.

Embodiment 24 includes the system of embodiment 19, wherein the first repeater further includes: a repeater detector configured to determine if when the first repeater is coupled to the second repeater by the RF wired signal path for transmitting the one or more RF communication signals; and the gain controller configured to adjust the gain or noise power of the amplifier of the first repeater or the second repeater based on the determined transmission loss across a RF wired signal path if when the first repeater is determined to be coupled to the second repeater by the RF wired signal path.

Embodiment 25 includes the system of embodiment 19, further comprising: one or more user-side donor antennas coupled to the first repeater; and one or more service-side server antennas coupled to the second repeater.

Embodiment 26 includes the system of embodiment 19, further comprising: one or more service-side server antennas coupled to the first repeater; and one or more user-side donor antennas coupled to the second repeater.

Embodiment 27 includes a repeater comprising one or more processors and memory configured to: amplify one or more Radio Frequency (RF) communication signals; determine a transmission loss across a RF wired signal path coupling the repeater to another repeater based upon an amplitude or power of the one or more RF communication signals as received at the another repeater and the amplitude or power of the one or more RF communication signals as received at the repeater; and adjust a gain or noise power of amplifying the one or more RF communication signals based on the determined transmission loss across the RF wired signal path.

Embodiment 28 includes the repeater of embodiment 27, wherein determining the transmission loss includes: determine an amplitude or power of the one or more RF communication signals as received at a port of the repeater; and determine the transmission loss across the RF wired signal path based on a difference between the amplitude or power of the one or more RF communication signals as received at the another repeater and the amplitude or power of the one or more RF communication signals as received at the first repeater.

Embodiment 29 includes the repeater of embodiment 27, wherein the one or more processors and memory are further configured to: determine if when the repeater is coupled to the another repeater by the RF wired signal path; and adjust the gain or noise power of amplifying the one or more RF communication signals based on the determined transmission loss across a RF wired signal path if when the repeater is determined to be coupled to the another repeater by the RF wired signal path.

Embodiment 30 includes the repeater of embodiment 27, wherein the gain or noise power of amplifying the one or more RF communication signals is adjusted to comply with an output constraint while offsetting at least a portion of the determined transmission loss across the RF wired signal path.

Embodiment 31 includes a method for calibrating a repeater comprising: sensing a signal level at a first repeater of a Radio Frequency (RF) communication signal transmitted from a second repeater to the first repeater on an RF wired signal path; receiving, at the first repeater, an indication of a signal level of the RF signal at the second repeater; determining a transmission loss across the RF wired signal path as a function of the signal level of the RF signal at the second repeater and the signal level of the RF signal at the first repeater; and adjusting a gain or noise power of the first repeater or the second repeater to compensate for the transmission loss across the RF wired signal path.

Embodiment 32 includes the method according to embodiment 31, wherein the RF communication signal includes a Third Generation Partnership Project (3GPP) Long Term Evolved (LTE) signal.

Embodiment 33 includes the method according to embodiment 31, wherein the gain or noise power of the first repeater or the second repeater is further adjusted to comply with an output constraint based on a regulatory standard.

Embodiment 34 includes the method according to embodiment 33, wherein the output constraint is based on a regulatory standard.

Embodiment 35 includes the method according to embodiment 31, wherein determining the transmission loss across the RF wired signal path and adjusting the gain or noise power is performed when the first and second repeaters are amplifying the RF communication signal.

Embodiment 36 includes a method for calibrating a repeater comprising: amplifying at both a first repeater and a second repeater a Radio Frequency (RF) communication signal transmitted between a first repeater and a second repeater on an RF wired signal path; sensing a signal level at a first repeater of a RF reference signal transmitted from a second repeater at a predetermined signal level to the first repeater on an RF wired signal path, wherein a frequency band of the RF reference signal is outside a frequency band of the RF communication signal; determining a transmission loss across the RF wired signal path as a function of the signal level of the RF reference signal at the first repeater; and adjusting a gain or noise power of the first repeater or the second repeater to compensate for the loss across the RF wired signal path in the RF communication signal.

Embodiment 37 includes the method according to embodiment 36, wherein the RF communication signal includes a Third Generation Partnership Project (3GPP) Long Term Evolved (LTE) signal.

Embodiment 38 includes the method according to embodiment 36, wherein the gain or noise power of the first repeater or the second repeater is further adjusted to comply with an output constraint based on a regulatory standard.

Embodiment 39 includes the method according to embodiment 36, wherein determining the transmission loss across the RF wired signal path and adjusting the gain or noise power is performed when the first and second repeaters are amplifying the RF communication signal.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object-oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc.

In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. A system comprising:
    a first repeater including;
        an amplifier configured to amplify one or more Radio Frequency (RF) communication signals;
        a transmission loss detector configured to determine a transmission loss of one or more RF reference signals across a RF wired signal path, wherein frequency bands of the one or more RF reference signals are outside frequency bands of the one or more RF communication signals to permit continuous amplifying the one or more RF communication signals while determining the transmission loss; and
        a gain controller configured to adjust a gain or noise power of the amplifier of the first repeater or a second repeater based on the determined transmission loss across the RF wired signal path; and
    the second repeater, coupled to the first repeater by the RF wired signal path, the second repeater including;
        an amplifier configured to amplify the one or more RF communication signals; and
        a signal generator configured to generate the one or more RF reference signals at a predetermined amplitude or power.

2. The system of claim 1, wherein the transmission loss detector comprises:
    a bandpass filter configured to pass the one or more RF reference signals and attenuate the one or more RF communication signals;
    a signal detector configured to determine an amplitude or power of the one or more RF reference signals as received at a port of the first repeater; and
    a processing logic configured to determine the transmission loss of the one or more RF reference signals across the RF wired signal path based on the predetermined amplitude or power of the one or more RF reference signals and the amplitude or power of the one or more RF reference signals as received at the port of the first repeater.

3. The system of claim 1, wherein the gain controller of the first repeater is configured to adjust the gain or noise power of the amplifier of the first repeater or second repeater to comply with an output constraint while offsetting at least a portion of the determined transmission loss across the RF wired signal path.

4. The system of claim 3, wherein the output constraint is based on a regulatory standard.

5. The system of claim 1, wherein the one or more RF communication signals includes an uplink Third Generation Partnership Project (3GPP) Long Term Evolved (LTE) signal and a downlink 3GPP LTE signal.

6. The system of claim 5, wherein a frequency band of a first of the one or more RF reference signals is below a frequency band of the uplink 3GPP LTE signal and a frequency band of a second of the one or more RF reference signals is above a frequency band of the downlink 3GPP LTE signal.

7. The system of claim 1, wherein the first repeater further includes:
a repeater detector configured to determine when the first repeater is coupled to the second repeater by the RF wired signal path for transmitting the one or more RF communication signals and one or more RF reference signals; and
the gain controller further configured to adjust the gain or noise power of the amplifier of the first repeater or the second repeater based on the determined transmission loss across a RF wired signal path when the first repeater is determined to be coupled to the second repeater by the RF wired signal path.

8. The system of claim 1, further comprising:
one or more donor antennas coupled to the first repeater; and
one or more server antennas coupled to the second repeater.

9. The system of claim 1, further comprising:
one or more server antennas coupled to the first repeater; and
one or more donor antennas coupled to the second repeater.

10. The system of claim 1, wherein the RF wired signal path comprises a coaxial cable.

11. A repeater comprising one or more processors and memory configured to:
amplify one or more Radio Frequency (RF) communication signals;
determine a transmission loss of one or more RF reference signals across a RF wired signal path coupling the repeater to another repeater, wherein frequency bands of the one or more RF reference signals are outside frequency bands of the one or more RF communication signals to permit continuous amplifying the one or more RF communication signals while determining the transmission loss; and
adjust a gain or noise power of amplifying the one or more RF communication signals based on the determined transmission loss across the RF wired signal path.

12. The repeater of claim 11, wherein determining the transmission loss includes:
filter to pass the one or more RF reference signals and attenuate the one or more RF communication signals;
determine an amplitude or power of the one or more RF reference signals as received at a port of the repeater; and
determine the transmission loss of one or more RF reference signals across the RF wired signal path based on the amplitude or power of the one or more RF reference signals as received at the port of the repeater.

13. The repeater of claim 11, wherein the one or more processors and memory are further configured to:
determine when the repeater is coupled to the another repeater by the RF wired signal path; and
adjust the gain or noise power of amplifying the one or more RF communication signals based on the determined transmission loss across the RF wired signal path, when the repeater is determined to be coupled to the another repeater by the RF wired signal path.

14. The repeater of claim 11, wherein the gain or noise power of amplifying the one or more RF communication signals is adjusted to comply with an output constraint while offsetting at least a portion of the determined transmission loss across the RF wired signal path.

15. The repeater of claim 14, wherein the output constraint is based on a regulatory standard.

16. The repeater of claim 11, wherein the RF wired signal path comprises a coaxial cable.

17. A method for calibrating a repeater comprising:
sensing a signal level at a first repeater of a Radio Frequency (RF) communication signal transmitted from a second repeater to the first repeater on an RF wired signal path;
generating, at the second repeater, one or more RF reference signals at a predetermined amplitude or power;
receiving, at the first repeater, an indication of a signal level of the RF signal at the second repeater;
determining a transmission loss across the RF wired signal path as a function of the signal level of the RF signal at the second repeater and the signal level of the RF signal at the first repeater;
determining a transmission loss of the one or more RF reference signals across the RF wired signal path, wherein frequency bands of the one or more RF reference signals are outside frequency bands of the RF communication signal to permit continuous amplifying of the one or more RF communication signals while determining the transmission loss across the RF wired signal path; and
adjusting a gain or noise power of the first repeater or the second repeater to compensate for the transmission loss across the RF wired signal path.

18. The method according to claim 17, wherein the RF communication signal includes a Third Generation Partnership Project (3GPP) Long Term Evolved (LTE) signal.

19. The method according to claim 17, wherein the gain or noise power of the first repeater or the second repeater is further adjusted to comply with an output constraint based on a regulatory standard.

20. The method according to claim 19, wherein the output constraint is based on a regulatory standard.

21. The method according to claim 17, wherein determining the transmission loss across the RF wired signal path and adjusting the gain or noise power is performed when the first and second repeaters are amplifying the RF communication signal.

* * * * *